United States Patent
Cheng et al.

(10) Patent No.: US 11,524,380 B2
(45) Date of Patent: Dec. 13, 2022

(54) MOTION CONTROL SYSTEM AND METHOD

(71) Applicant: INDUSTRIAL TECHNOLOGY RESEARCH INSTITUTE, Hsinchu (TW)

(72) Inventors: Chih-Ping Cheng, Hsinchu (TW); Chin-Hui Chen, Hsinchu (TW); Ming-Chun Ho, Hsinchu (TW); Tzuo-Liang Luo, Hsinchu (TW); Wan-Kun Chang, Hsinchu (TW); Shuo-Peng Liang, Hsinchu (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 87 days.

(21) Appl. No.: 17/136,263

(22) Filed: Dec. 29, 2020

(65) Prior Publication Data
US 2022/0184764 A1 Jun. 16, 2022

(30) Foreign Application Priority Data
Dec. 11, 2020 (TW) .................. 109143952

(51) Int. Cl.
*B23Q 15/08* (2006.01)
*G05B 19/416* (2006.01)

(52) U.S. Cl.
CPC ........... *B23Q 15/08* (2013.01); *G05B 19/416* (2013.01); *B23Q 2717/006* (2013.01)

(58) Field of Classification Search
None
See application file for complete search history.

(56) References Cited

U.S. PATENT DOCUMENTS

| 7,684,876 B2 | 3/2010 | Grgic |
| 9,251,033 B2 | 2/2016 | Kirchhofer |

(Continued)

FOREIGN PATENT DOCUMENTS

| CN | 103067507 | 4/2013 |
| CN | 103582867 | 2/2014 |

(Continued)

OTHER PUBLICATIONS

Machine Translation of Fengjiang et al. CN 108052073 B (Year: 2019).*
5G-ACIA, "5G for Connected Industry and Automation", White Paper; 5G-ACIA; Apr. 1, 2018; 1-10.
3GPP TS 22.104, "3rd Generation Partnership Project; Technical Specification Group Services and System Aspects; Service requirements for cyber-physical control applications in vertical domains", Stage 1 (Release 17); 3GPP; Dec. 1, 2019; 1-10.

(Continued)

*Primary Examiner* — Ryan A Jarrett
(74) *Attorney, Agent, or Firm* — Amin, Turocy & Watson, LLP (57) ABSTRACT

A motion control system and a motion control method are provided. The motion control method includes: sending a plurality of machining commands to a second controller by a first controller at a cloud; storing the plurality of machining commands in a buffer by the second controller; and operating the machine tool according to the plurality of machining commands stored in the buffer. As such, when poor communication occurs between the first controller and the second controller, the second controller causes the buffer to send a deceleration command to the machine tool so as to cause the machine tool to operate at a reduced speed, thereby avoiding unexpected motion such as sudden shutdown of the machine tool and damage to machined products.

18 Claims, 12 Drawing Sheets

(56) References Cited

U.S. PATENT DOCUMENTS

| | | |
|---|---|---|
| 2013/0173026 A1 | 7/2013 | Kawana et al. |
| 2014/0053150 A1 | 2/2014 | Barnett et al. |
| 2018/0218148 A1 | 8/2018 | D'Errico et al. |
| 2020/0125068 A1 | 4/2020 | Trounson, III |

FOREIGN PATENT DOCUMENTS

| | | |
|---|---|---|
| CN | 102736553 | 5/2014 |
| CN | 103238143 | 11/2016 |
| CN | 108241304 | 7/2018 |
| CN | 106790617 | 7/2019 |
| CN | 108052073 | 10/2019 |
| TW | 201120663 | 6/2011 |
| TW | 201308073 | 2/2013 |
| TW | I578830 | 4/2017 |
| TW | M570975 | 12/2018 |
| TW | I668634 | 8/2019 |
| TW | I670672 | 9/2019 |
| TW | 202012097 | 4/2020 |
| TW | 202022652 | 6/2020 |

OTHER PUBLICATIONS

3GPP TS 22.261, "3rd Generation Partnership Project; Technical Specification Group Services and System Aspects; Service requirements for the 5G system", Stage 1 (Release 17); 3GPP; Dec. 1, 2019; 1-10.

3GPP TS 22.804, "3rd Generation Partnership Project; Technical Specification Group Services and System Aspects; Study on Communication for Automation in Vertical Domains", (Release 16); 3GPP; Dec. 1, 2018; 1-10.

Liu, et al. "Augmented Reality-assisted Intelligent Window for Cyber-Physical Machine Tools", Journal of Manufacturing Systems; Jan. 1, 2017; 280-286.

Ericsson, "The 5G business potential", Terminsstart Telekom; Oct. 1, 2017; 1-10.

Ericsson, "5G for business: a 2030 market compass—setting a direction for 5G-powered B2B opportunities", Oct. 1, 2017; 1-10.

Taiwanese Office Action for Taiwanese Patent Application No. 109143952 dated Dec. 3, 2021.

\* cited by examiner

MOTION CONTROL SYSTEM AND METHOD

CROSS-REFERENCE TO RELATED APPLICATIONS

This application claims priority to Taiwan Application Serial No. 109143952, filed on Dec. 11, 2020. The entirety of the above-mentioned patent application is hereby incorporated by reference herein and made a part of this specification.

BACKGROUND

1. Technical Field

The present disclosure relates to control systems and methods, and more particularly, to a motion control system and method having a remote control mechanism.

2. Description of Related Art

Along with the rapid development of machine tool automation, performing machining operations by inputting related parameters has become a mainstream. Therefore, computer numerical control (CNC) technology has been widely applied in machine tools for machining operations. Meanwhile, a machine tool generally goes through an adjustment process before leaving the factory. Through adjustment of related parameters, the machine tool can meet certain performance indicators and hence meet specific machining requirements specified by customers.

However, during operation of a conventional machine tool, an operator has to stay at the location of the machine tool (e.g., a control center of the factory) to control the operation of the machine tool. As such, a lot of human resources are needed in the factory, and the operator cannot leave the factory at any time, which may cause the problem of overwork of the operator.

Therefore, along with the development of fifth generation (5G) communication industries, a remote control mechanism has been developed by taking features of high speed and low latency (1 ms) of 5G communication so as to establish a CNC wireless control system. As such, the operator can remotely control the operation of the machine tool in the factory through communication transmission of a wireless network mechanism, and a plurality of machine tools can be controlled to perform the same machining operation at the same time so as to overcome the above-described drawbacks.

However, since the conventional CNC wireless control system uses a network mechanism for signal transmission, if poor communication occurs in the network, it may become difficult for the machine tools in the factory to receive signals. Consequently, the machine tools cannot operate normally. For example, problems such as abnormal mechanical conditions (e.g., cutting tool jitter, etc.), sudden shutdown or other unexpected motion may prevent the machine tools from effectively performing machining operations and cause defects in machined products. Hence, the defective products have to be scrapped.

Therefore, how to prevent the machine tools from being unable to operate normally due to poor communication has become an urgent issue in the art.

SUMMARY

In view of the above-described drawbacks, the present disclosure provides a motion control system applicable to a machine tool equipped with a cutting tool. The motion control system comprises: a first controller separately arranged from the machine tool and used for sending machining commands; a second controller communicatively connected to the first controller and the machine tool for receiving the machining commands sent from the first controller; and a buffer communicatively connected to the second controller for storing the machining commands sent from the first controller.

The present disclosure further provides a motion control method applicable to a machine tool equipped with a cutting tool. The motion control method comprises: sending a plurality of machining commands from a first controller, wherein the first controller is separately arranged from the machine tool; receiving the plurality of machining commands sent from the first controller by a second controller; transmitting the plurality of machining commands to a buffer by the second controller for the buffer to store the plurality of machining commands; and operating the machine tool according to the plurality of machining commands stored by the buffer.

According to the motion control system and the motion control method of the present disclosure, since the buffer temporarily stores the machining commands sent from the first controller, during remote control of the machine tool by the first controller, the operation speed of the machine tool can be adjusted at any time according to the communication state. Therefore, compared with the prior art, when poor communication occurs between the first controller and the second controller, even if the second controller cannot receive new machining commands, the second controller can cause the buffer to send a deceleration command to the machine tool so as to cause the machine tool to operate at a reduced speed, thereby avoiding an abnormal mechanical condition (e.g., cutting tool jitter, etc.), sudden shutdown or other unexpected motion and hence avoiding damage to machined products.

BRIEF DESCRIPTION OF THE DRAWINGS

FIG. 1' is a schematic diagram showing the operational architecture of FIG. 1.

FIG. 3' is a schematic diagram showing the operational architecture of a portion of FIG. 1.

FIG. 3" is a schematic diagram showing the principle of algorithm used by the second controller of FIG. 1.

FIG. 4A' is a schematic diagram showing a computing result of the second controller of FIG. 4A.

FIG. 4C' is a schematic diagram showing a computing result of the second controller of FIG. 4C.

FIG. 4D' is a schematic diagram showing a computing result of the second controller of FIG. 4D.

FIG. 4D" is a schematic diagram showing the operational architecture of the motion control system transmitting a deceleration command according to the present disclosure.

DETAILED DESCRIPTION

The following illustrative embodiments are provided to illustrate the present disclosure, these and other advantages and effects can be apparent to those in the art after reading this specification.

It should be noted that all the drawings are not intended to limit the present disclosure. Various modifications and variations can be made without departing from the spirit of the present disclosure. Further, terms such as "first," "second," "on," "a," etc., are merely for illustrative purposes and should not be construed to limit the scope of the present disclosure.

Figure 1:
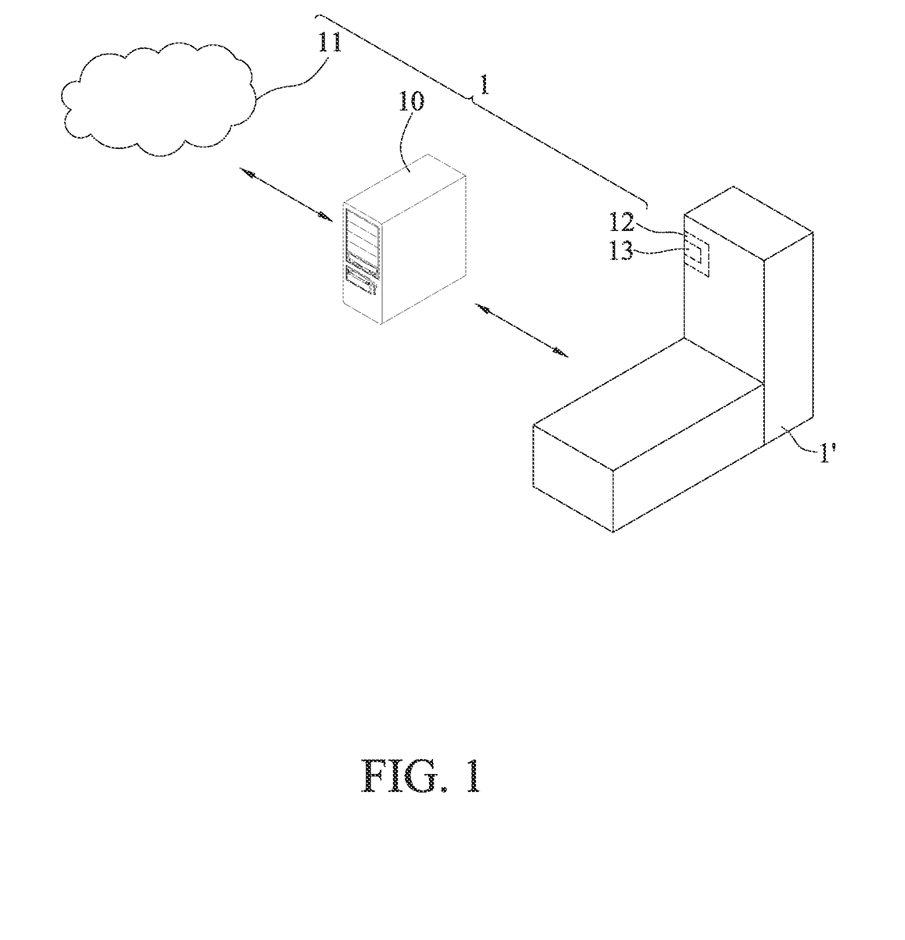
FIG. 1 is a schematic diagram showing the configuration of a motion control system according to the present disclosure.

FIG. 1 is a schematic diagram showing the configuration of a motion control system 1 according to the present disclosure. Referring to FIG. 1, the motion control system 1 has a first controller 11, at least one second controller 12 and a buffer 13 connected to the second controller 12. However, the present disclosure does not limit the integration, replacement, or addition/reduction of the various components of the aforementioned architecture configuration.

In an embodiment, referring to FIG. 1, the motion control system 1 is applicable to a CNC machine tool 1'. The machine tool 1' is equipped with a cutting tool arranged over a working platform.

The first controller 11 is, for example, a remote or cloud virtualized controller. The first controller 11 is separately arranged from the machine tool 1' and communicatively connected to the second controller 12 for sending required data (e.g., machining commands) to the second controller 12.

Figure 2:
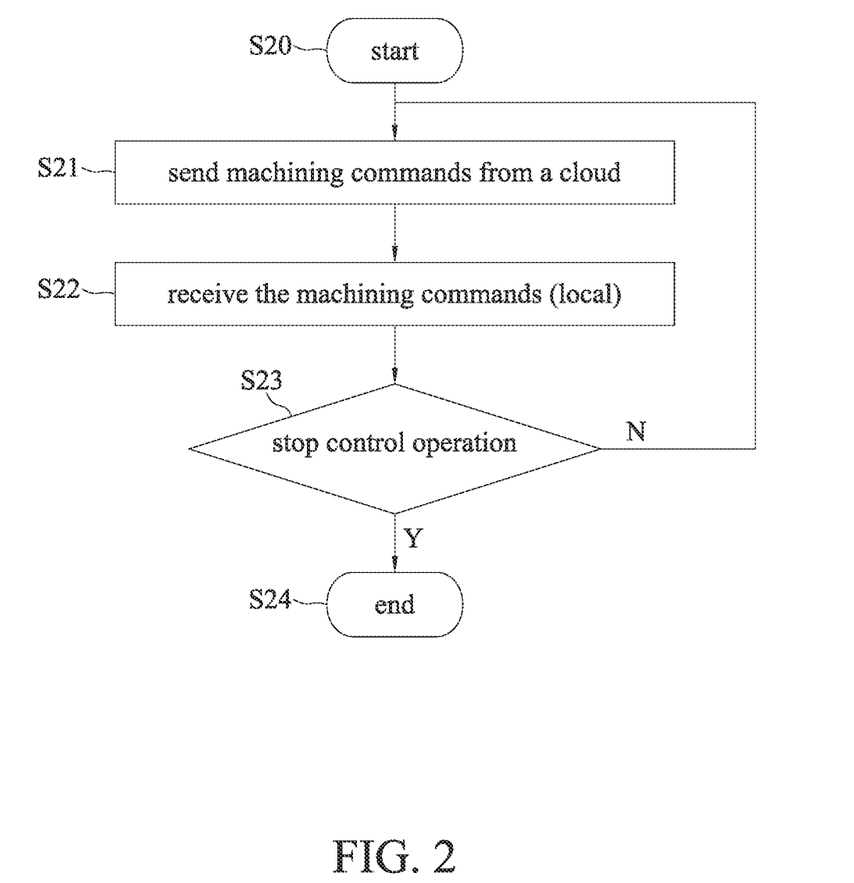
FIG. 2 is a flow diagram showing operation of a first controller of FIG. 1.

In an embodiment, the first controller 11 is programmed in a remote electronic device such as a cloud server and performs a control operation as shown in FIG. 2. The operation process is described as follows.

Referring to FIG. 2, at step S20, the first controller 11 is started and communicatively connected to the second controller 12.

In an embodiment, the first controller 11 is a cloud interpolation controller for generating machining commands, for example, motion commands of each axis of a motor driver of the machine tool 1'.

At step S21, the first controller 11 generates and sends the machining commands to an intermediate server 10. In an embodiment, the first controller 11 transmits the machining commands to the intermediate server 10 through a message transmission protocol of message queuing telemetry transport (MQTT), as shown in FIG. 1. Therein, the intermediate server 10 is a MQTT server.

At step S22, the second controller 12 (local controller) receives the machining commands. In an embodiment, the MQTT-type intermediate server 10 can be regarded as a data transmission bridge. In the case the hardware of the remote device (e.g., cloud server) has a low efficiency and the network is in a poor condition, the intermediate server 10 with the designed publish/subscribe message protocol can effectively transfer the machining commands to the second controller 12, as shown in FIG. 1.

At step S23, the user determines whether to stop operation of the first controller 11.

At step S24, if the user determines to stop operation of the first controller 11, the first controller 11 ends its control operation and hence the intermediate server 10 cannot transfer the machining commands to the second controller 12.

The second controller 12 is indirectly communicatively connected to the first controller 11 for receiving the machining commands sent from the first controller 11 and driving a motor driver (not shown) of the machine tool 1'.

Referring to FIG. 1', in an embodiment, the second controller 12 is a physical electronic structure (e.g., having a control chip) having a wireless communication bus conversion module 12a and a local motion control module 12b communicatively connected to the wireless communication bus conversion module 12a, Therein, the motion control module 12b outputs motion commands to each motor driver of the machine tool 1', and the wireless communication bus conversion module 12a enables the first controller 11 and the second controller 12 to communicate with one another through a wireless network.

Further, the second controller 12 can be arranged on the machine tool 1'. For example, the second controller 12 is standard equipment of the machine tool 1' so as to transmit the machining commands to the machine tool 1'. In other embodiments, the second controller 12 is communicatively connected to the machine tool 1'. For example, the second controller 12 transmits the machining commands to the machine tool 1' through wired or wireless network transmission. Therefore, the second controller 12 may be a stand-alone computer (e.g., a desktop computer, a notebook computer, etc.) electrically connected to the machine tool 1' and having computing and displaying results functions.

It should be understood that the first controller 11 is communicatively connected to the machine tool 1' through the second controller 12, and the communication transmission mode between the first controller 11, the second controller 12 and the machine tool 1' can be configured according to the requirements.

Figure 3:
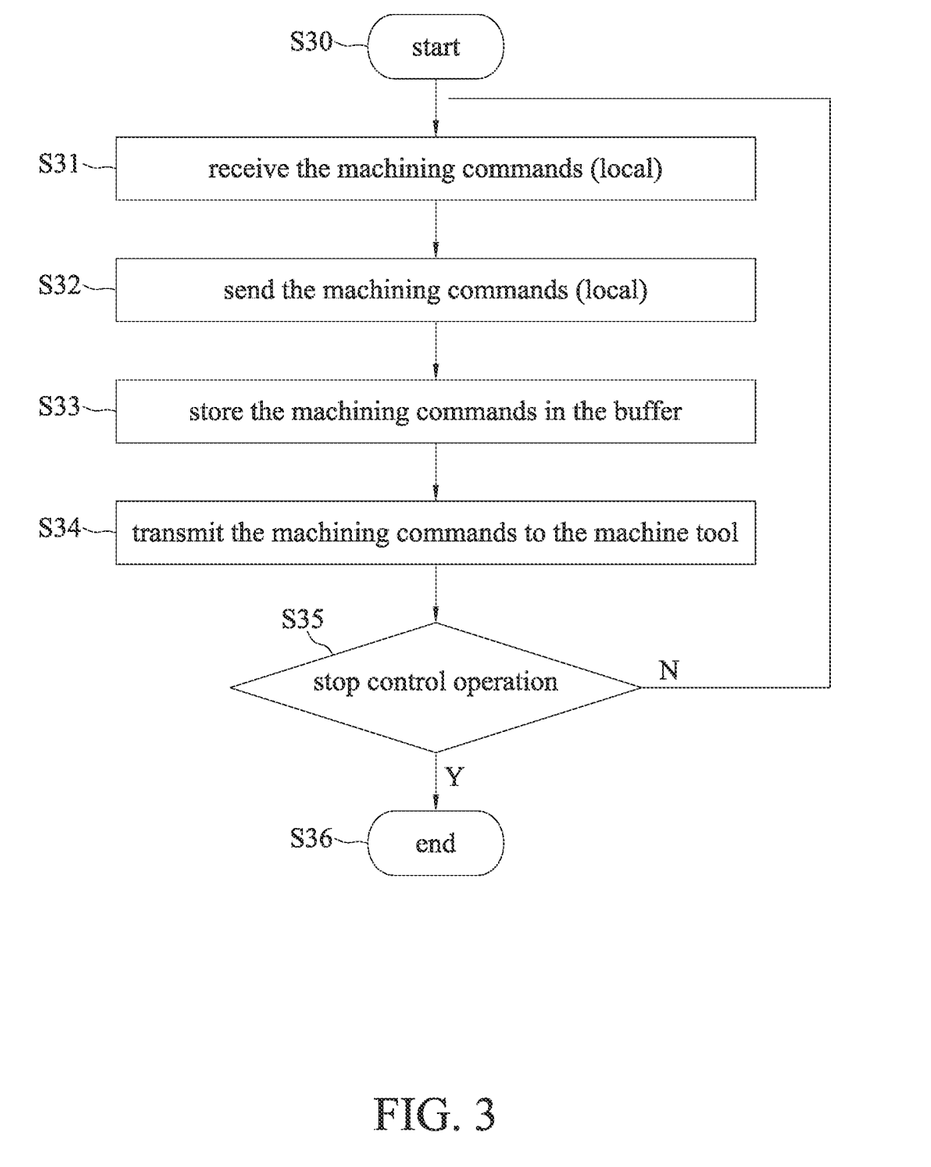
FIG. 3 is a flow diagram showing operation of a second controller of FIG. 1.

Further, FIG. 3 shows a control operation performed by the second controller 12. The operation process is described as follows.

Referring to FIG. 3, at step S30, the second controller 12 (which is viewed as local) is started and communicatively connects the machine tool 1' and the first controller 11 (which is viewed as cloud).

At step S31, the second controller 12 receives the machining commands. In an embodiment, the second controller 12 serves as a local controller, which receives the machining commands transferred by the intermediate server 10 and provides the machining commands to the machine tool 1'.

At steps S32 to S33, the second controller 12 sends the machining commands to the buffer 13 and the buffer 13 stores the machining commands.

At step S34, the buffer 13 transmits the machining commands to the machine tool 1'. In an embodiment, the buffer 13 transmits the machining commands to the machine tool 1' by using Ethernet control automation technology (EtherCAT), and the second controller 12 can also receive feedback signals of the machine tool 1' through the Ethernet control automation technology and transmit the feedback signals to the first controller 11. For example, the MQTT-type intermediate server 10 has a bidirectional transmission mechanism, as shown in FIG. 3', so as for the second controller 12 to transmit the feedback signals to the first controller 11.

At step S35, the user determines whether to stop operation of the second controller 12.

At step S36, if the user determines to stop operation of the second controller 12, the second controller 12 ends its control operation and the machine tool 1' stops operation.

The buffer 13 is communicatively connected to and controlled by the second controller 12 for receiving and storing the machining commands of the second controller 12.

In an embodiment, the buffer 13 is arranged in the second controller 12, and the buffer 13 is also communicatively connected to the machine tool 1' for transmitting the stored machining commands to the machine tool 1'. For example, the buffer 13 is arranged in the motion control module 12b, as shown in FIG. 1', so as to be communicatively connected to the wireless communication bus conversion module 12a. It should be understood that the second controller 12 is communicatively connected to the machine tool 1' through the buffer 13, and the communication transmission mode between the buffer 13, the second controller 12 and the machine tool 1' can be configured according to the requirements.

Further, the second controller 12 can adjust the operating speed of the machine tool 1' according to the number of the machining commands stored by the buffer 13. For example, the second controller 12 adjusts the axial deceleration distance of the cutting tool of the machine tool 1' through an algorithm as shown in the following equation (1):

$$D = \tfrac{1}{2} \cdot V/t \cdot C$$

Therein, D represents deceleration distance (i.e., shadow area of FIG. 3"), V represents a machining command or motion command speed, t represents communication cycle time, and C represents an acceleration and deceleration time constant.

Furthermore, according to the number of the machining commands stored by the buffer 13, the second controller 12 defines a normal state, an excessive state and an insufficient state, and the acceleration and deceleration time constant C varies for these states. For example, the acceleration and deceleration time constant C is built inside the machine tool 1' and the second controller 12 needs to be designed in coordination with the machine tool 1'.

Figure 4A:
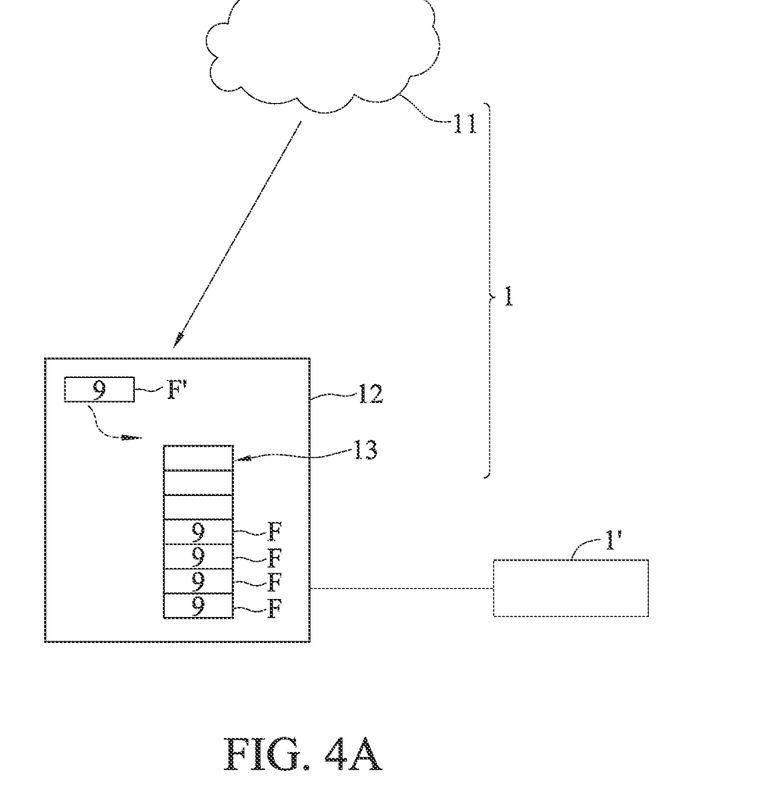
FIG. 4A is a schematic diagram showing the operational architecture of the second controller of FIG. 1 when the buffer is at a normal state.

The normal state means that communication transmission of the motion control system 1 is normal, the second controller 12 can smoothly receive the machining commands of the first controller 11, and the number of the machining commands stored in the buffer 13 is normal. Therein, the interpolation cycle time and the communication cycle time t of the first controller 11 and the second controller 12 are set to be identical. For example, both are set to be 3 ms. For example, a piece of data F (four pieces of data as shown in FIG. 4A) is generated in each interpolation cycle time, the acceleration and deceleration time constant C for the normal state is defined as 6 ms, and when the motion command speed V received by the second controller 12 is 9 pulses, the deceleration distance D calculated according to equation (1) is 9 pulses. For example, $$\tfrac{1}{2} \cdot 9/3 \cdot 6 = 9 \quad \text{(pulses)},$$

Therefore, the total motion amount (9+9+9+9=36, e.g., the area of FIG. 4A') of the four pieces of data F stored in the buffer 13 is greater than the deceleration distance D, i.e., 36>9. As such, the second controller 12 can continuously transmit a single piece of data F' to the buffer 13, thereby enabling the motion control module 12b to drive the motor driver of the machine tool 1'.

Figure 4B:
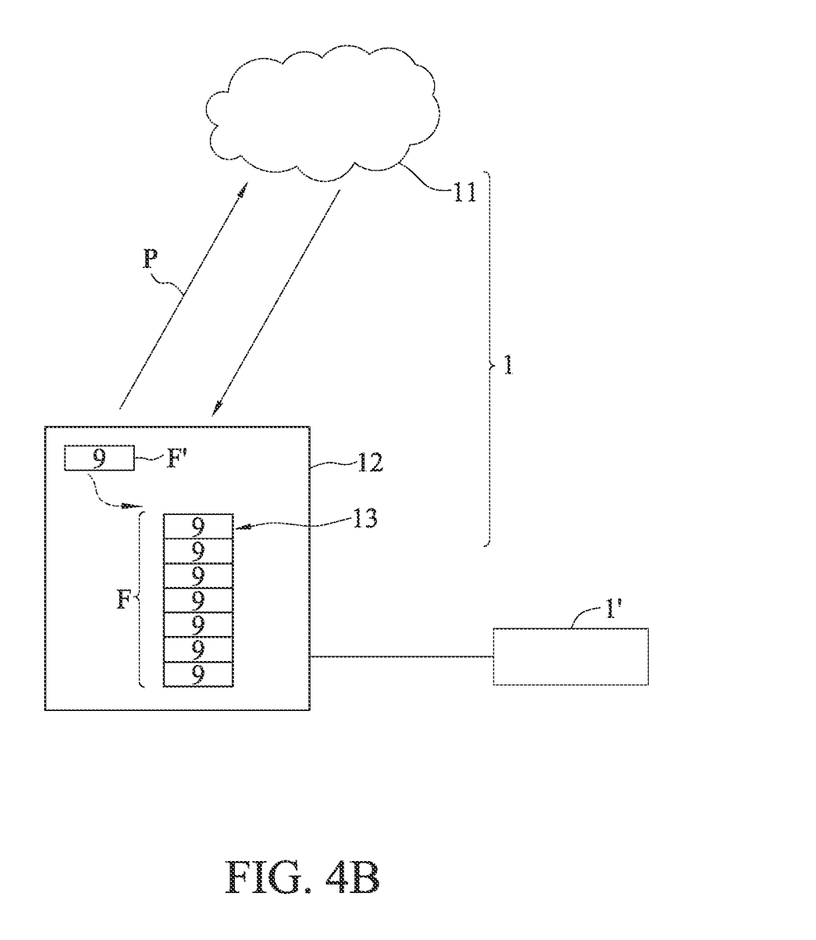
FIG. 4B is a schematic diagram showing the operational architecture of the second controller of FIG. 1 when the buffer is at an excessive state.

The excessive state means that the number of the machining commands stored in the buffer 13 is too many. That is, the second controller 12 receives too many machining commands of the first controller 11, and data F' received by the second controller 12 continues to increase, as shown in FIG. 4B. Therefore, the second controller 12 cannot timely process data F in the buffer 13 and will transmit a warning signal P to the first controller 11 so as to cause the first controller 11 to suspend or stop sending machining commands and issue an alarm.

The insufficient state means that the number of the machining commands stored in the buffer 13 is too few. Generally, it can be divided into a static period and a motion period.

Figure 4C:
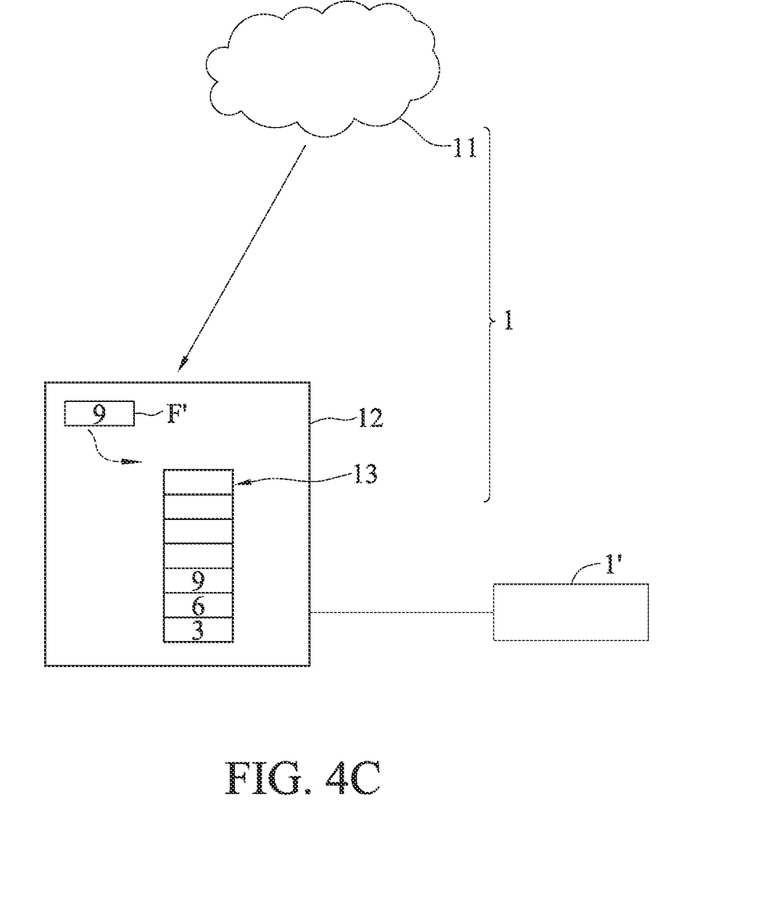
FIG. 4C is a schematic diagram showing the operational architecture of the second controller of FIG. 1 when the buffer is at an insufficient state.

In an embodiment, the insufficient state of the static period is the time domain when the second controller 12 is prepared to start receiving data (e.g., when the machine tool 1' is prepared to start operation from a pause state or the motion control system 1 is just powered on). At this time, the second controller 12 will start to read data F in the buffer 13 (e.g., three pieces of data with 9 pulses, 6 pulses and 3 pulses, respectively, as shown in FIG. 4C), and after each axial motion command reaches a specified distance D' (the area of FIG. 4C'), the second controller 12 causes the buffer 13 to start transmission. For example, the interpolation cycle time and communication cycle time t of the first controller 11 and the second controller 12 are set to be identical (e.g., 3 ms), and the acceleration and deceleration time constant C for the insufficient state of the static period is defined as 6 ms, and when the motion command speed V received by the second controller 12 is 9 pulses, the required specified distance D' calculated according to another equation is 18 pulses. For example, $$2 \cdot \tfrac{1}{2} \cdot 9/3 \cdot 6 = 18 \quad \text{(pulses)}$$

Therefore, the total motion amount (9+6+3=18, e.g., the area of FIG. 4C') stored in the buffer 13 is equal to (or greater than) the specified distance D', i.e., 18≥18. As such, the second controller 12 can start to transmit a single piece of data F (3 pulses) to the machine tool 1'.

Therefore, a buffer determination mechanism is established according to said another equation. During the insufficient state of the static period, the second controller 12 will not transmit data F in the buffer 13 to the machine tool 1' immediately, thus avoiding sudden shutdown of the machine tool 1' that could occur when the first controller 11 does not transmit data F' to the second controller 12 and there is no machining command in the buffer 13.

Figure 4D:
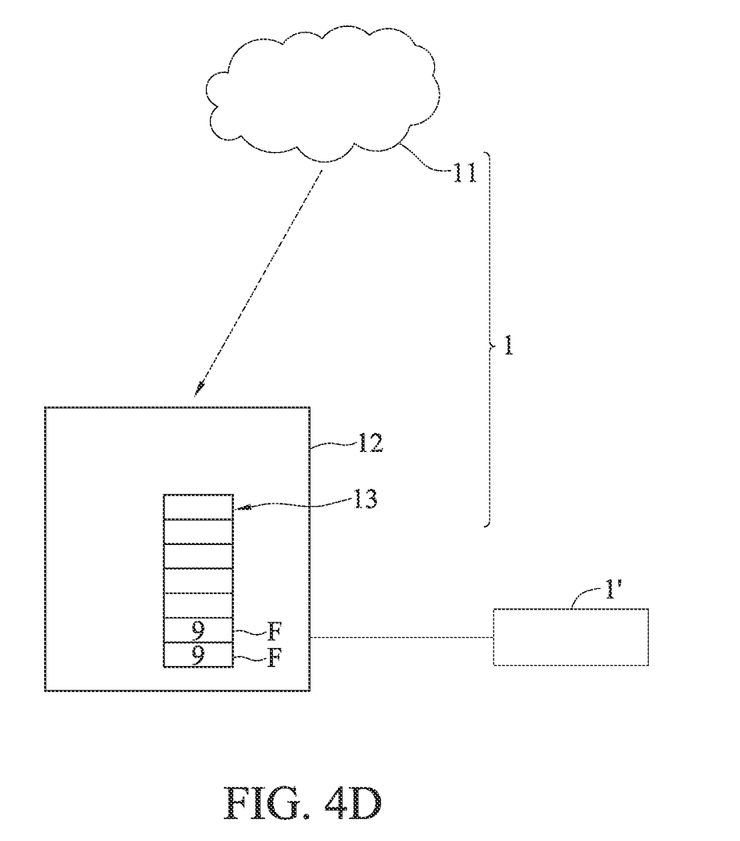
FIG. 4D is a schematic diagram showing the operational architecture of the second controller of FIG. 1 when the buffer is at an insufficient state according to another aspect of the present disclosure.

On the other hand, the insufficient state of the motion period occurs when communication transmission of the motion control system 1 becomes abnormal, the second controller 12 receives the machining commands of the first controller 11 intermittently or even stops completely, and the number of the machining commands stored in the buffer 13 is insufficient (e.g., two pieces of data F with 9 pulses, respectively, as shown in FIG. 4D). For example, the interpolation cycle time and communication cycle time t of the first controller 11 and the second controller 12 are set to be identical (e.g., 3 ms), the acceleration and deceleration time constant C for the insufficient state of the motion period is defined as 7 ms, and when the motion command speed V received by the second controller 12 is 9 pulses, the required deceleration distance D calculated according to equation (1) is 10.5 pulses. For example, $$½ \cdot 9/3 \cdot 7 = 10.5 \quad \text{(pulses)} \tag{5}$$

Although the total motion amount (9+9=18, e.g., the area of FIG. 4D') stored in the buffer 13 is greater than the deceleration distance D, i.e., 18>10.5, after the second controller 12 transmits a single piece of data F (9 pulses) to the machine tool 1', the total motion amount stored in the buffer 13 will be less than the deceleration distance D, i.e., 9<10.5. As such, the second controller 12 will generate a deceleration command Therefore, based on the area of the deceleration distance D (e.g., slope M of FIG. 4D'), the second controller 12 will generate a slope K slower than the deceleration distance D. As such, based on the slope K, the content of data F in the buffer 13 is changed into data F1, F2, F3, F4 containing a deceleration command (with 6 pulses, 3 pulses, 2 pulses and 7 pulses, as shown in FIG. 4D'), and according to the deceleration requirement, the buffer 13 sequentially transmits data F1, F2, F3, F4 with 6 pulses, 3 pulses, 2 pulses and 7 pulses to the machine tool 1'(as shown in FIG. 4D"), thus causing the motor driver of the machine tool 1' to operate at a reduced speed or even stop operating slowly. As such, the machine tool does not stop suddenly (i.e., suddenly change from 9 pulses to 0 pulse), thereby avoiding an abnormal mechanical condition (e.g., cutting tool jitter, etc.), sudden shutdown or other unexpected motion and hence avoiding damage to machined products.

It can be understood that, under the insufficient state of the motion period, if communication transmission of the motion control system 1 returns to normal, the second controller 12 can return to the normal state from the insufficient state of the motion period.

Figure 5:
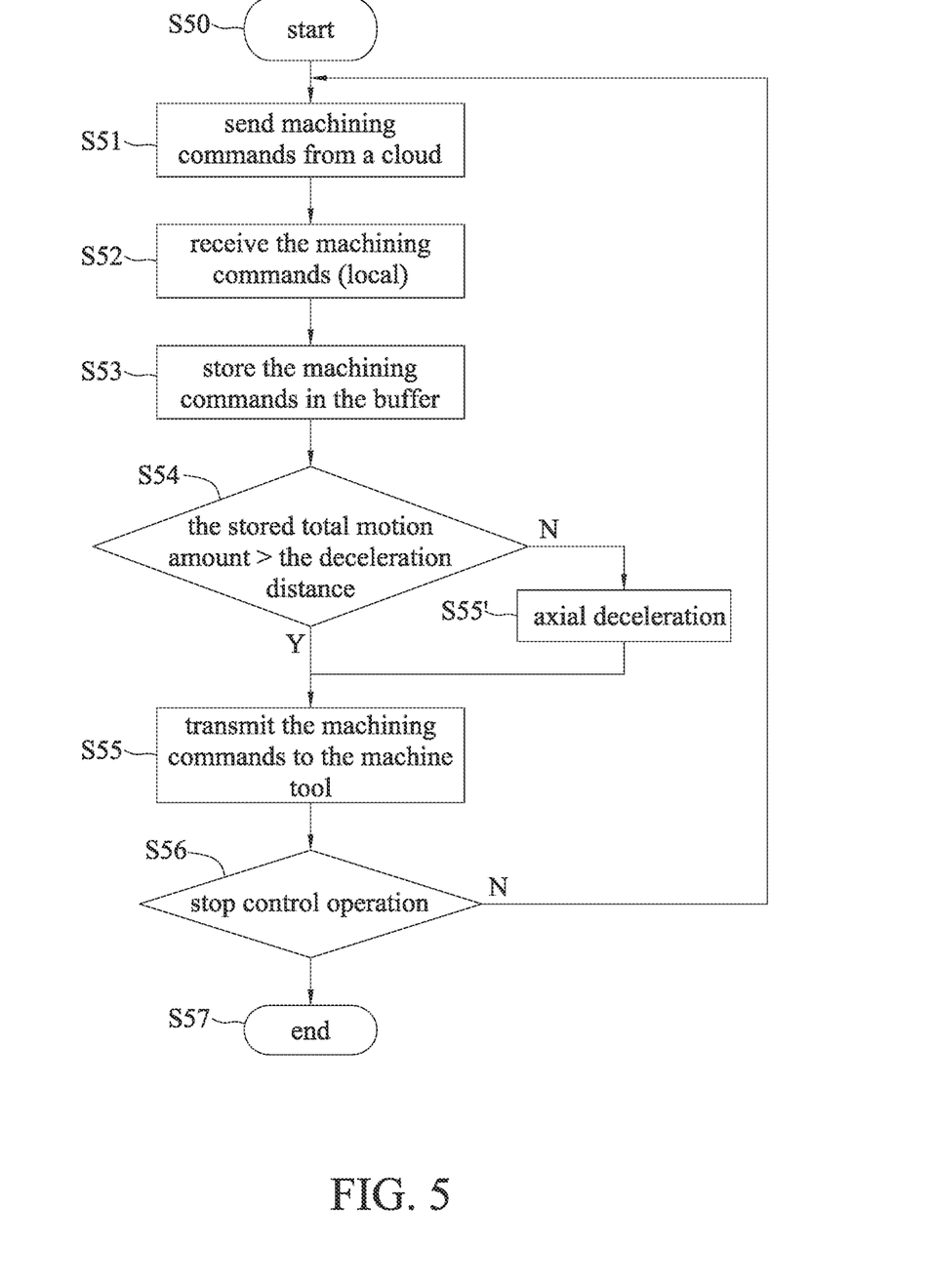
FIG. 5 is a flow diagram of a motion control method according to the present disclosure.

FIG. 5 is a flow diagram of a motion control method according to the present disclosure. In an embodiment, the motion control system 1 is used for performing the motion control method, and the second controller 12 only controls a single axial command of the machine tool 1'.

First, at step S50, the user starts the motion control system 1, and the first controller 11 is indirectly communicatively connected to the machine tool 1'.

Next, at step S51, the user controls the first controller 11 (cloud) to transmit a plurality of machining commands to the second controller 12 (local).

Next, at step S52, after receiving the plurality of machining commands, the second controller 12 transmits the plurality of machining commands to the buffer 13.

In an embodiment, the second controller 12 automatically adjusts whether to transmit the plurality of machining commands to the buffer 13 according to the amount of data stored in the buffer 13. For example, if the buffer 13 presents an excessive state (as shown in FIG. 4B), the second controller 12 transmits a warning signal P to the first controller 11 so as to cause the first controller 11 to suspend sending new machining commands Next, at step S53, the buffer 13 stores the plurality of machining commands Then, at steps S54 to S55, according to the instruction of the second controller 12, the buffer 13 transmits the plurality of machining commands to the machine tool 1' or its driver.

In an embodiment, the second controller 12 can determine whether the number of the machining commands stored in the buffer 13 is normal (i.e., whether the stored total motion amount is greater than the deceleration distance). For example, if the buffer 13 presents a normal state (as shown in FIG. 4A), the second controller 12 will effectively receive the machining commands of the first controller 11 and transmit the machining commands to the machine tool 1' via the buffer 13. As such, the machine tool 1' can operate at a normal speed.

Further, if the buffer 13 presents an excessive state (as shown in FIG. 4B), the second controller 12 will transmit a warning signal P to the first controller 11 so as to cause the first controller 11 to suspend sending new machining commands. Alternatively, if the buffer 13 presents an insufficient state (as shown in FIG. 4C or FIG. 4D), as shown at step S55', the second controller 12 will issue an axial deceleration command to make the machine tool 1' operate at a reduced speed.

Next, at step S56, the user determines whether to stop operation of the motion control system 1.

In an embodiment, the user can stop the motion control system 1 at any time according to the machining state of the machine tool 1'. For example, the second controller 12 sends a feedback signal of the machine tool 1' back to the first controller 11 so as for the user to know the machining state of the machine tool 1'. As such, the user can determine whether to stop operation of the motion control system 1.

At step S57, if the user determines to stop operation of the motion control system 1, the motion control system 1 ends its control operation and the machine tool 1' stops operation.

According to the motion control system 1 and the motion control method thereof of the present disclosure, through the design of the buffer 13, during remote control of the machine tool 1' by the first controller 11, the operation speed of the machine tool 1' can be adjusted at any time according to the communication (e.g., network) state. Therefore, compared with the prior art, when poor communication occurs between the first controller 11 and the second controller 12 (or the intermediate server 10 fails), even if it is not easy (or impossible) for the second controller 12 to receive new machining commands, the second controller 12 can cause the buffer 13 to transfer a deceleration command to the machine tool 1' so as to cause the machine tool 1' to operate at a reduced speed, thus avoiding an abnormal mechanical condition (e.g., cutting tool jitter, etc.), sudden shutdown or other unexpected motion and hence avoiding damage to machined products and ensuring the machined products made by the machine tool 1' have no defects.

Figure 6:
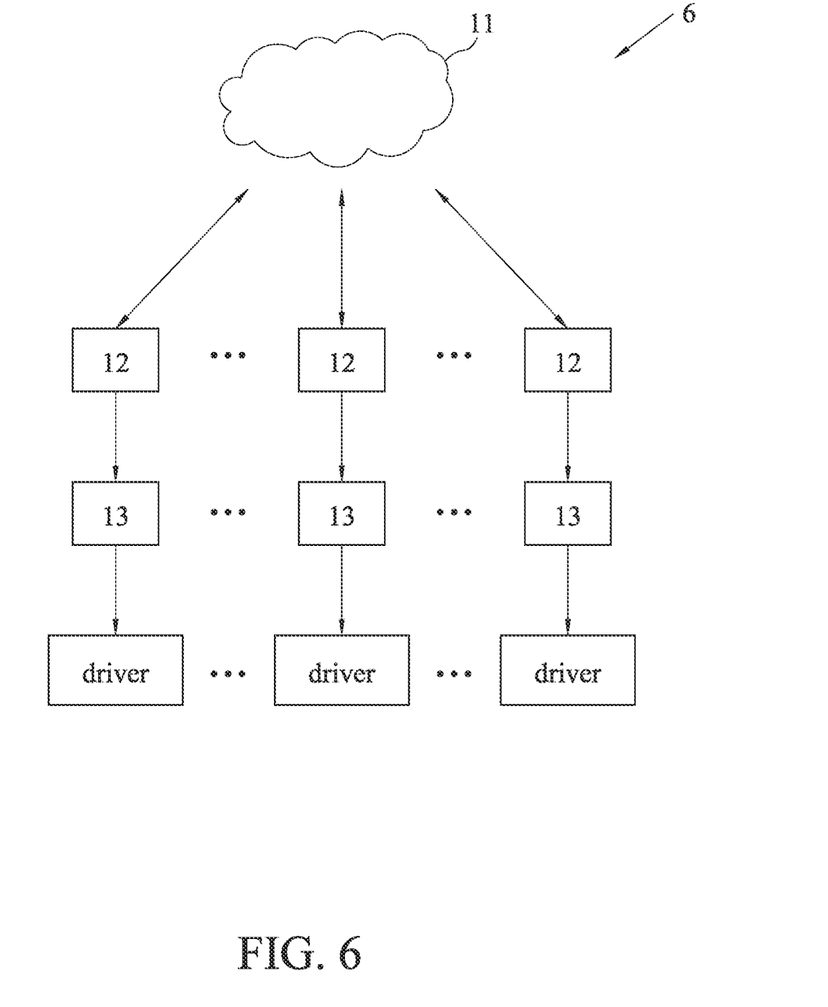
FIG. 6 is a schematic diagram showing configuration of the motion control system according to another embodiment of the present disclosure.

Referring to FIG. 6, in another embodiment, the motion control system 6 can remotely control a plurality of drivers through the single first controller 11. The plurality of drivers are arranged on the same machine tool 1' or different machine tools 1'.

The above-described descriptions of the detailed embodiments are to illustrate the preferred implementation according to the present disclosure, and it is not to limit the scope of the present disclosure. Accordingly, all modifications and variations completed by those with ordinary skill in the art should fall within the scope of present disclosure defined by the appended claims.

What is claimed is:

1. A motion control system applicable to a machine tool equipped with a cutting tool, the motion control system comprising:
   a first controller separately arranged from the machine tool and used for sending machining commands;
   a second controller communicatively connected to the first controller and the machine tool for receiving the machining commands sent from the first controller; and a buffer communicatively connected to the second controller for storing the machining commands sent from the first controller, wherein the second controller adjusts an operation speed of the machine tool according to a number of the machining commands stored by the buffer.

2. The motion control system of claim 1, wherein the first controller is a virtualized controller.

3. The motion control system of claim 1, wherein the first controller is programmed in a cloud server.

4. The motion control system of claim 1, wherein the second controller is arranged on the machine tool.

5. The motion control system of claim 1, wherein the second controller is communicatively connected to the first controller through an intermediate server.

6. The motion control system of claim 5, wherein the intermediate server has a bidirectional transmission mechanism.

7. The motion control system of claim 1, wherein the buffer is arranged in the second controller.

8. The motion control system of claim 1, wherein the buffer is further communicatively connected to the machine tool for transmitting the stored machining commands to the machine tool.

9. The motion control system of claim 1, wherein the second controller defines a normal state, an excessive state and an insufficient state according to a number of the machining commands stored by the buffer.

10. A motion control method applicable to a machine tool equipped with a cutting tool, the motion control method comprising:
  sending a plurality of machining commands from a first controller, wherein the first controller is separately arranged from the machine tool;
  receiving the plurality of machining commands sent from the first controller by a second controller;
  transmitting the plurality of machining commands to a buffer by the second controller for the buffer to store the plurality of machining commands; and
  operating the machine tool according to the plurality of machining commands stored by the buffer,
  wherein the second controller adjusts an operation speed of the machine tool according to a number of the machining commands stored by the buffer.

11. The motion control method of claim 10, wherein the first controller is a virtualized controller.

12. The motion control method of claim 10, wherein the first controller is programmed in a cloud server.

13. The motion control method of claim 10, wherein the second controller is arranged on the machine tool.

14. The motion control method of claim 10, wherein the second controller is communicatively connected to the first controller through an intermediate server.

15. The motion control method of claim 14, wherein the intermediate server has a bidirectional transmission mechanism.

16. The motion control method of claim 10, wherein the buffer is arranged in the second controller.

17. The motion control method of claim 10, wherein the buffer is further communicatively connected to the machine tool for transmitting the stored machining commands to the machine tool.

18. The motion control method of claim 10, wherein the second controller defines a normal state, an excessive state and an insufficient state according to a number of the machining commands stored by the buffer.

* * * * *